United States Patent [19]

Fukuma

[11] 4,194,176
[45] Mar. 18, 1980

[54] CASHIER IDENTIFYING ADMINISTRATION IN AN ELECTRONIC CASH REGISTER

[75] Inventor: Yositaka Fukuma, Yamatokoriyama, Japan

[73] Assignee: Sharp Kabushiki Kaisha, Osaka, Japan

[21] Appl. No.: 955,337

[22] Filed: Oct. 27, 1978

[30] Foreign Application Priority Data

Oct. 27, 1977 [JP] Japan ................................ 52/130531

[51] Int. Cl.² ............................................. H04Q 3/00
[52] U.S. Cl. ........................... 340/147 R; 340/149 A; 340/543
[58] Field of Search ............... 340/147 R, 149 A, 543; 235/7 R

[56] References Cited

U.S. PATENT DOCUMENTS 4,027,140  5/1977  Fowler ................................ 235/7 R Primary Examiner—Harold I. Pitts
Attorney, Agent, or Firm—Birch, Stewart, Kolasch & Birch

[57] ABSTRACT

Only one lockable key switch is provided to which plural kinds of operator clerk keys held by cashiers and a master clerk key held by an administrator are inserted. The lockable key switch develops a signal representative of the inserted clerk key for identifying a cashier operating the electronic cash register. Nonlockable switches are formed on a keyboard panel for introducing a clerk specifying signal when the master clerk key is inserted into the lockable key switch.

4 Claims, 3 Drawing Figures

CASHIER IDENTIFYING ADMINISTRATION IN AN ELECTRONIC CASH REGISTER

BACKGROUND AND SUMMARY OF THE INVENTION

The present invention relates to an electronic cash register and, more particularly, to an administration system for identifying each cashier or clerk.

In case where many cashiers operate one electronic cash register, it is required that administration be effected cashier by cashier, namely, the registration check be conducted for every cashier.

To achieve the above objects, in the conventional electronic cash register, a plurality of pin tumbler cylinders are secured to the electronic cash register to which clerk keys held by cashiers are inserted for identifying the cashier operating the electronic cash register. Because of the provision of the plural pin tumbler cylinders, the conventional electronic cash register occupies a large space and is expensive.

Accordingly, an object of the present invention is to provide an electronic cash register of a simple construction, which ensures accurate administration for identifying cashiers.

Another object of the present invention is to provide a cashier identifying administration system in an electronic cash register, which requires only one lockable key switch.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, one lockable key switch is provided to which operator clerk keys held by cashiers and a master clerk key held by the administrator are inserted. The lockable key switch develops a code signal representative of the inserted clerk key for identifying a cashier operating the electronic cash register. Nonlockable switches are provided on a keyboard panel for introducing the code signal when the master clerk key is inserted into the lockable key switch.

Numeral keys are adopted to introduce a secret number assigned to the respective cashier for controlling the operation of the electronic cash register.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Referring now in detail to the drawings, and to facilitate a more complete understanding of the present invention, a general construction of an electronic cash register and the conventional cashier identifying administration system will be first described with reference to FIGS. 3 and 1, respectively.

Figure 3:
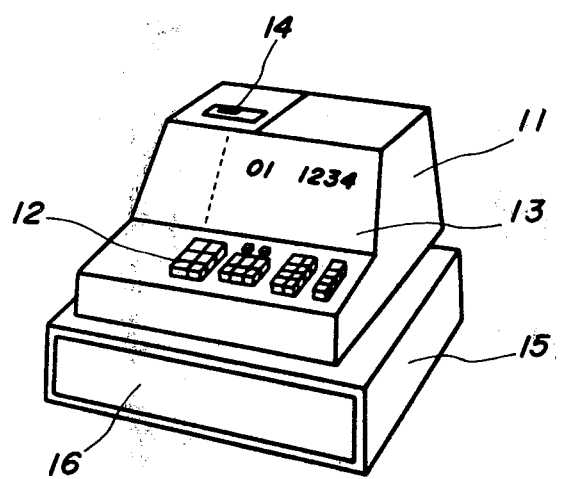
FIG. 3 is a perspective view of an electronic cash register.

FIG. 3 shows a general construction of an electronic cash register, which mainly comprises a cash register body 11, a keyboard panel 12, a display panel 13, a receipt paper outlet 14, a drawer case 15, and a drawer 16. The keyboard panel 12 includes numeral keys for introducing numeral information, department keys for specifying departments of merchandise, etc.

It is usual that several cashiers or operator clerks operate a same electronic cash register. In such a case, it is required that administration be effected cashier by cashier.

Figure 1:
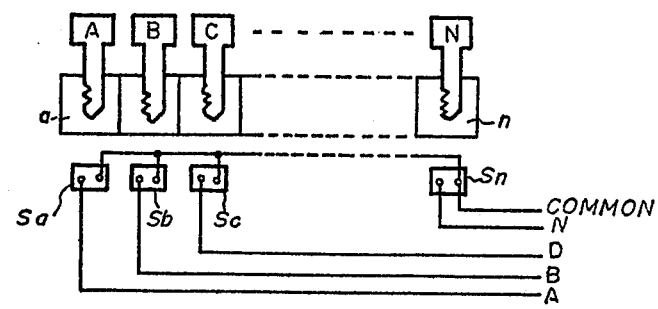
FIG. 1 is a schematic block diagram of the conventional cashier identifying administration system.

FIG. 1 shows a cashier identifying administration system of the prior art.

In the conventional system, a plurality of pin tumbler cylinders a through n are secured to the electronic cash register. Cashiers carry their personal keys A through N, which are adapted to the corresponding pin tumbler cylinders a through n. When, for example, a cashier A' inserts his key A into the pin tumbler cylinder a, a corresponding switch $S_a$ is switched on to identify the cashier A'. One terminals of switches $S_a$ through $S_n$ are commonly connected to a common terminal, and the other terminals develop cashier identifying signals.

An administrator carries the personal keys A through N of the respective cashiers to perform the registration operation instead of the clerks.

Since the convention system requires the plurality of pin tumbler cylinders, the electronic cash register becomes large and expensive. The present invention is to solve the above problems.

Figure 2:
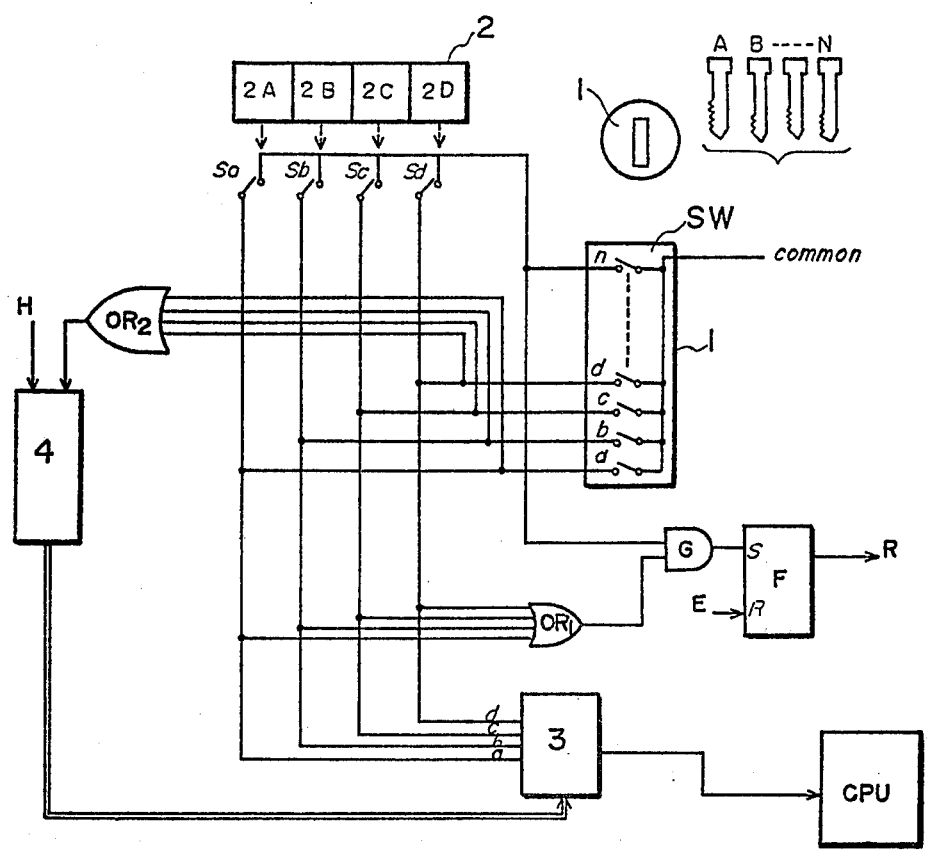
FIG. 2 is a schematic block diagram of an embodiment of a cashier identifying administration system of the present invention.

FIG. 2 shows an embodiment of a cashier identifying administration system of the present invention.

The present cashier identifying administration system employs only one lockable key switch 1, which is associated with a key code signal generating switch SW for developing a code signal corresponding to a personal key inserted into the lockable key switch 1. When, for example, an operator clerk A' inserts his key A into the lockable key switch 1, a switch a included in the key code signal generating switch SW is switched on to develop a code signal assigned to the operator clerk A'. When a master clerk key N held by an administrator is inserted into the lockable key switch 1, a switch n is switched on to develop a master signal.

One terminals of the switches a through n employed in the key code signal generating switch SW are commonly connected to a common terminal, and the other terminals develop the code signal representative of the clerk corresponding to the personal key which is inserted into the lockable key switch 1. In a typical system, the output terminal connected to the switch a has a weight "1", the terminal of the switch b has a weight "2", the terminal of the switch c has a weight "4", and the terminal of the switch d has a weight "8", thereby identifying the respective operator clerks.

Nonlockable pushbutton switches 2 are provided on the keyboard panel. The nonlockable pushbutton switches 2 comprise a pushbutton 2A associated with a switch $S_a$ for developing a code signal corresponding to the personal key A, a pushbutton 2B associated with a switch $S_b$ for developing a code signal corresponding to the personal key B, a pushbutton 2C associated with a switch $S_c$ for developing a code signal corresponding to the personal key C, and a push-button 2D associated with a switch $S_d$ for developing a code signal corresponding to the personal key D.

One terminals of the switches $S_a$ through $S_d$ are commonly connected to the output terminal of the switch n, and the other terminals of the switches $S_a$ through $S_d$ are connected to the output terminals of the corresponding switches a through d included in the key code signal generating switch SW. Output signals of the switches a through d and $S_a$ through $S_d$ are applied to an OR gate $OR_1$ and a code read-out circuit 3.

An output signal of the OR gate $OR_1$ is applied to one input terminal of an AND gate G. The other input terminal of the AND gate G is connected to receive the output signal derived from the switch n included within the key code signal generating switch SW. An output signal of the AND gate G is applied to a set input terminal of a flip-flop F. The flip-flop F develops a registration enable signal R in the set condition, and is reset by a signal E which is developed when the registration operation is completed.

The code read-out circuit 3 functions to identify the cashier through the use of the code signals derived from the switch terminals a through d and $S_a$ through $S_d$, thereby supplying a central processor unit CPU with a cashier specifying signal.

In the system of FIG. 2, each operator cashier carries his personal key A, B, C or D, and the administrator carries the master key N.

When, for example, a cashier A' inserts his personal key A into the lockable key switch 1, the switch a is switched on to place the output line connected to the switch a into the logic value "1". The thus developed output signal is introduced into the code read-out circuit 3. That is, the code read-out circuit 3 receives an input signal "1000", thereby identifying that the cashier A' operates the electronic cash register. The registration operation is conducted to the memory bank assigned to the cashier A'.

When, for example, the administrator operates the electronic cash register instead of the cashier A', the master key N is inserted into the lockable key switch 1 to enable the pushbutton switch 2 and the AND gate G, and the switch 2A is depressed. The switch $S_a$ is switched on to let the output line connected to the switch $S_a$ bear the logic value "1". The code read-out circuit 3 receives the input signal "1000", and the OR gate $OR_1$ develops a signal to turn on the AND gate G.

The flip-flop F is set by the output signal of the AND gate G to develop the registration enable signal R, which is applied to the central processor unit CPU. The central processor unit CPU comprises "$\mu$PD766G-11" manufactured by Nippon Electric Company, Ltd. The code read-out circuit 3 develops an output signal for specifying the cashier A'. That is, the central processor unit CPU controls the registration operation so that the registration is effected to the memory bank assigned to the cashier A'. When the registration operation is completed, the central processor unit CPU develops the control signal E for resetting the flip-flop F.

Since the flip-flop F is set only during the registration to the specific cashier bank under the condition where the master key N is inserted into the lockable key switch 1, the erroneous registration operation is minimized.

The output signals of the switches a through d are also applied to a coincidence detection circuit 4 via an OR gate $OR_2$. An output signal of the coincidence detection circuit 4 is applied to the code read-out circuit 3. With this arrangement, several cashiers can select their respective memory bank through the use of one and the same clerk key.

For example, cashiers $A_1$, $A_2$ and $A_3$ carry the personal key A, respectively. And, the respective cashiers $A_1$, $A_2$ and $A_3$ have their own secret numbers, for example, "100", "200", and "300".

When, for example, the cashier $A_1$ operates the electronic cash register, the personal key A is inserted into the lockable key switch 1 and the secret number "100" is introduced into the system through the numeral keys provided on the keyboard panel. The coincidence detection circuit 4 receives the signal from the lockable key switch 1 and the secret number information through a key input information line H. Then, the coincidence detection circuit 4 functions to compare the introduced signals with the preset code memory for developing the code signal specifying the cashier $A_1$ to the code read-out circuit 3. Therefore, the registration operation is conducted to a memory bank assigned to the cashier $A_1$.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A cashier identifying system for an electronic cash register comprising:
   a key switch means to which plural kinds of operator clerk keys and a master clerk key are inserted;
   key signal developing means for developing signals representation of the keys inserted into said key switch means;
   keyboard switch means for introducing an information signal for specifying a specific operator clerk;
   means for enabling said keyboard switch means when the master clerk key is inserted into said key switch means; and
   a code signal generator for developing a code signal specifying the operator clerk through the use of said signals derived from said key signal developing means when any one of said operator clerk keys is inserted into said key switch means, and through the use of said information signal derived from said keyboard switch means when said master clerk key is inserted into said key switch means.

2. The cashier identifying system of claim 1, which further comprises:
   bistable switching means for developing a control signal for enabling the registration operation of said electronic cash register in one condition;
   means for placing said bistable switching means in said one condition when said master clerk key is inserted into said key switch means and said information signal is derived from said keyboard switch means; and
   means for placing said bistable switching means in the other condition when registration operation is completed by said electronic cash register.

3. The cashier identifying system of claim 2, wherein said bistable switching means comprise a flip-flop including:

a set input terminal connected to receive said information signal derived from said keyboard switch means;

a reset input terminal for receiving a registration completion indication signal; and a set output terminal for developing said control signal.

4. The cashier identifying system of claim 1, 2 or 3, which further comprises:

numeral keys for introducing a secret number; and determination means for specifying a specific operator clerk through the use of said signals derived from said key signal developing means and said secret number introduced from said numeral keys.

* * * * *